May 16, 1939.                M. B. HALL                2,158,785
                        LIQUID LEVEL INDICATOR
                         Filed Oct. 10, 1936
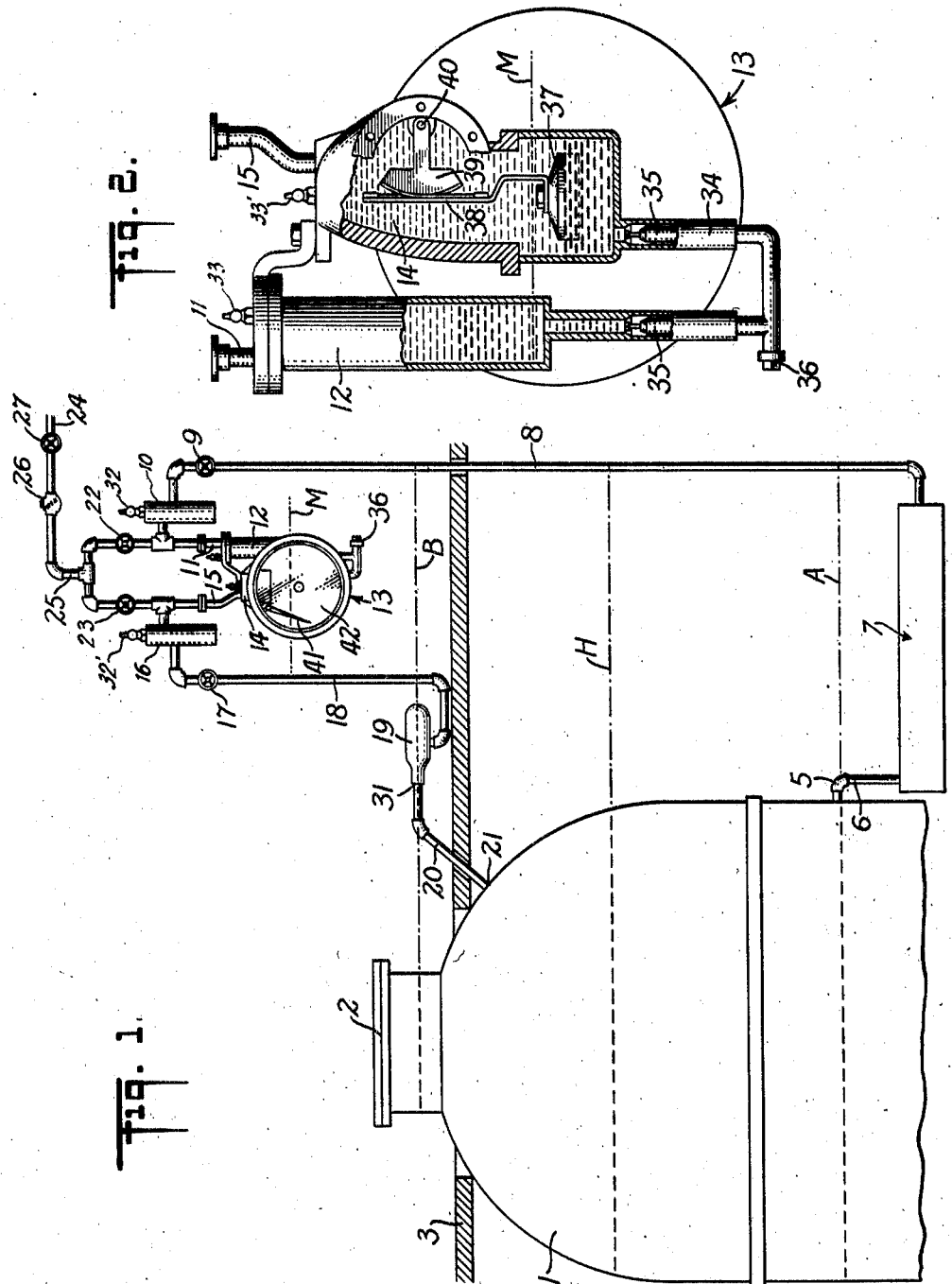
INVENTOR
Malcolm B. Hall
BY
Blair, Curtis + Dunne
ATTORNEYS Patented May 16, 1939

2,158,785

UNITED STATES PATENT OFFICE 2,158,785

LIQUID LEVEL INDICATOR

Malcolm B. Hall, Foxboro, Mass., assignor to The Foxboro Company, Foxboro, Mass., a corporation of Massachusetts Application October 10, 1936, Serial No. 104,927

5 Claims. (Cl. 73—302)

This invention relates to an apparatus for measuring and recording liquid level.

In the present embodiment of the invention, the hydrostatic pressure of a body of liquid whose level is to be measured is taken at a reference level and is transmitted, by a barometric column, i. e. a column of liquid in a pipe sealed at the top and open and exposed to pressure at the bottom, to pressure-sensitive mechanism such, for example, as a manometer and float arrangement. Properly calibrated, then, the pressure-sensitive mechanism translates hydrostatic pressure into liquid level. This provides a novel and convenient method for measuring the level of a liquid at a point above and removed from the body of the liquid.

Since this level measurement is affected by the pressure on the surface of the liquid, if the surface pressure varies, it is desirable to compensate for the effect of the surface pressure by using a differential-pressure measuring device, one side of which is connected to the hydrostatic pressure and the other side of which is in communication with the surface pressure. If the liquid being measured is corrosive or chemically active, a second barometric column may be conveniently used to provide a connection for transmitting the surface pressure to the differential-pressure measuring device. Such an arrangement also provides a means for compensating for the pressure caused by the weight of the liquid in the first column and thus permits a zero indication on the differential pressure measuring device at some convenient liquid level. The two barometric columns are preferably filled with a liquid that does not have such chemical reaction with the liquid being measured as would interfere with the operation of the measuring mechanism or its associated parts. This liquid prevents the corrosive effect of the liquid being measured from reaching the measuring device and itself is chemically inactive toward said measuring device so as not to detrimentally attack the instrument.

Accordingly, it is an object of this invention to provide an improved apparatus for determining liquid level.

Apparatus incorporating an embodiment of the invention is particularly adapted to the problem of measuring the liquor level in sulphite digesters, in the operation of which accurate knowledge of the level aids in the maintaining of those levels best suited for the production of the quality of pulp desired.

The measurement of liquor level in a sulphite digester presents a difficult problem due to the corrosive and chemically active nature of the sulphite liquor and also because of the high and varying pressures existing in the digester during the cooking operation. In the past "try cocks" have been installed at various levels on the side of the digester to indicate the liquid level. But this means is unsatisfactory because of the obnoxious character of the acid fumes that escape when the cocks are "tried".

Some digesters have been equipped with gauge glasses for level measurement purposes, but such glasses must always be mounted on the side of the digester and, therefore, below the floor where the operator works, thus making it necessary for the cook to go to the floor below in order to make his observations of the liquor level unless some system of mirrors or signals is used. Further, not only do gauge glasses tend to foul and so become inoperative, but also there is a decided element of danger in the use of gauge glasses, for they are relatively fragile. If one breaks, it permits the hot liquor and $SO_2$ gas to escape under pressure into the digester house.

It is another object of this invention, therefore, to provide an apparatus for continuously measuring the liquor level in a sulphite digester, and to provide simple and efficient apparatus for indicating and recording this liquor level measurement at a desired point, such as the cooking control station at the top of the digester, whereby the many advantages occurring from accurate knowledge of the liquor level at all times may be availed of.

These and other apparent objects and advantages are obtained by the means described in the following specification, and may be more readily understood by reference to the accompanying drawing, in which:

Figure 1 illustrates apparatus, embodying the invention, applied to the top of a sulphite digester illustrated in part; and Figure 2 shows a rear view of the differential-pressure indicating and recording instrument used in this embodiment, with a portion thereof partially cut away to show operating elements.

Referring to Figure 1, the upper portion of a sulphite digester is shown at 1 in which the level of the liquor is to be determined. The top 2 of the digester 1 extends up through the operating floor 3 of the digester house (not shown), from which position the cooking operations are customarily controlled. An instrument, generally indicated at 13, is also located above the floor 3 for indicating and recording the level in the digester.

The instrument is suitably connected with the hydrostatic pressure of the liquor in the digester. To this end a short pipe or drop leg 6 (lower part of Figure 1) is connected at its upper end to digester 1 at a point 5 corresponding to the lower limit A of the range through which measurement of level is desired. The lower end of drop leg 6 is connected through an enlarged pipe or capacity chamber 7 to a pipe or drop leg 8 that extends up through floor 3 to a low-pressure chamber 12 of the differential-pressure indicating and recording instrument 13. Provided between the pipe 8 and the instrument is a valve 9 and air trap 10 for purposes to be described hereinafter.

The instrument is connected also with the surface or gas pressure above the liquor level. To this end a high-pressure chamber 14 of the instrument is similarly connected through pipe 15, air trap 16, valve 17 and pipe or drop leg 18, to the bottom of a horizontal condensing chamber 19. The chamber 19 is connected, preferably about half-way up, to the top of the digester 1 at some convenient point 21 by pipe 20 which slopes downwardly toward the digester. The low and high pressure chambers 12 and 14, and their respective piping, are connected respectively through pipes 11 and 15, valves 22 and 23, pipe 25, check-valve 26 and a hand valve 27 to a water supply pipe 24.

When the apparatus is in condition for operation, the drop legs 8 and 18 are filled with water from supply 24 to form two barometric columns. To accomplish this the valves 27, 22 and 9 are opened (keeping valves 17 and 23 closed) to admit water to fill the chamber 12, pipe 11, air trap 10, drop leg 8, capacity tank 7 and the short drop leg 6. Valve 9 is then closed and the air vent 33 on the top of the low pressure chamber 12 of the instrument 13 is open until water flows therefrom thus venting any air or other gas which may have been trapped therein. Vent 33 is then closed and the air vent 32 in the top of air trap 10 is opened until all the air trapped therein escapes and water flows out. The vent 32 is then closed and finally valve 22 is closed. In a similar manner valves 23 and 17 are opened (keeping valves 22 and 9 closed) and the high pressure chamber 14, pipe 15, air trap 16, drop leg 18 and part of the condensing chamber 19 are filled with water, valve 17 is closed, vent 33' in the top of chamber 14 and vent 32' in air trap 16 are respectively opened until water flows out and then closed, and finally the valve 23 is closed. This procedure fills the entire system with water and ensures the escape of air or other gas imprisoned therein, and, when the valves 9 and 17 are reopened, the apparatus is ready for operation.

The drop legs 8 and 18 thus become barometric legs with the instrument 13 measuring the differential pressure between their upper ends. The barometric columns 8 and 18 also provide an effective seal between the instrument 13 and the digester 1, preventing the corrosive liquor in the digester from reaching the instrument. With this arrangement, seepage of the corrosive liquor into the drop legs is prevented from reaching the instrument by flushing the system, preferably after each cook, with fresh water from supply 24. This may be accomplished simply by opening valve 22 to flush leg 8, and then after closing valve 22, opening valve 23 to flush leg 18. When the first operation is performed the differential gauge will indicate zero differential and when the second operation is carried out it will indicate maximum differential. Thus the record will show whether or not the system has been flushed.

When filling the system the water flows into the condensing chamber 19 and flows out through pipe 20 until the flow is stopped. Thereafter it continues to drain out of pipe 20 until the level drops to the point 31, at which time the lower portion of the chamber 19 remains filled up to the height of the outlet at point 31. This condensing chamber 19 is so located with respect to the digester 1 that the level of the water in the condensing chamber corresponds to the upper limit B of the range of level variation in the digester. The condensing chamber 19, being at a lower temperature than the digester 1, also serves to condense vapors reaching it through the pipe 20 which then drain back through the pipe to the digester.

The drop leg 6 is provided to prevent the water from running out of the drop leg 8 during operation and thereby destroying the effect of the barometric leg. It accomplishes this by acting as the usual short leg of a barometric column which prevents gas from entering the barometer tube and depressing the liquid column therein. Condensing chamber 19 acts in a similar manner to prevent the water from running out of drop leg 18. In addition, drop leg 6 and condensing chamber 19 provide water seals between the digester 1 and the instrument 13 in the event that the drop legs 8 and 18 are drained.

Because the tubing which would customarily be used for the pipes 8 and 18 in connecting instrument 13 to the digester usually is of small diameter, and because the volumes of the instrument chambers 12 and 14 may be relatively large as compared with the volumes of these pipes, the capacity chamber 7 is placed in pipe 8 to provide sufficient water to keep pipe 8 full of water from the chamber 7 even when the liquid in leg 6 is pushed back to its farthest position when the liquor in the digester rises to its highest level, thereby preventing liquor in the digester from reaching chamber 12. Condensing chamber 19 functions similarly in connection with pipe 18.

It is desirable that pipe 20, condensing chamber 19, the drop leg 6 and capacity tank 7 all be constructed of acid-resisting material.

The check valve 26 prevents water in the legs or the instrument from backing up in the water supply 24 in the event of the pressure in the water main becoming less than the pressure in the digester during flushing operation.

Figure 2 shows a rear view of the differential-pressure indicating and recording instrument 13 with a portion thereof cut away in order that the operation of the device may be more readily understood. Such an instrument may be similar to that shown in U. S. Patent 1,808,207 to Lyman Cook, issued June 2, 1931. This device may be considered a U-tube mercury manometer provided with mechanism for measuring, indicating and recording the difference in the level of the mercury in the two sides of the manometer. For convenience, it may be described as comprising a low-pressure chamber 12 and a high-pressure chamber 14, connected by a U-tube 34 and filled with mercury to the proper level. The U-tube 34 is provided with check valves 35 in each leg thereof to prevent a sudden rush of the mercury from one chamber to the other, and also with a drain plug 36 for draining the mercury from the instrument when necessary.

Change of the level of the mercury in the high-pressure chamber 14 is measured by a float mechanism which comprises a float 37 attached to an upright member 38 which coacts with a segmental lever arm 39 rotating on shaft 40. Rotation of shaft 40 positions a pen arm 41 (see Figure 1) with respect to a rotating chart 42 in the customary manner. The two pressure chambers 12 and 14 are connected to the pressures whose differential is to be measured by the pipes 11 and 15, respectively, and are completely filled with water and to form the upper ends of the barometric legs 8 and 18.

In the embodiment shown, this instrument has a differential pressure range at least equivalent to the hydrostatic pressure exerted by a column of the liquid being measured whose height is equal to the distance between the levels A and B. The pressure in the high-pressure chamber 14 of the instrument 13 will be equal to the pressure on the top of the liquor minus the hydrostatic pressure exerted by a column of water of a height equal to the distance between the level B and a level M which is the mean level of the mercury in the two chambers of the differential instrument 13. As the height of this water column is approximately constant for any given installation, the pressure in the high-pressure chamber 14 will vary directly with the pressure in the top of the digester 1. The pressure in the chamber 12 will be equal to the pressure on the surface of the liquor plus the hydrostatic pressure exerted by a column of the fluid of a height equal to the distance from the actual liquor level H to reference level A, minus the pressure exerted by the column of water M—A. As both sides of the differential pressure meter 13 are affected equally by the pressure in the top of the digester, and by the hydrostatic pressure B—M, the resultant indication of this instrument is independent of these pressures.

Assuming the specific gravity of the liquid in the digester to be the same as the specific gravity of water, the effective length of the barometric leg 8 is changed by variation of the liquid level in the digester 1. If the liquid level in the digester is at a level H, as indicated in Figure 1, it is evident that the pressure exerted by a column of the liquid of the length H—A upon the low-pressure chamber will be counteracted and cancelled by the weight of the water in pipe 8 between the levels H and A. Thus, it can readily be seen that during the liquid level measuring operation the pressure in the low-pressure chamber 12 will always be less than the pressure in the high-pressure chamber 14 by an amount equal to the pressure exerted by a column of water of the height H—B, whereby the instrument 13 will indicate a maximum pressure differential with the liquid level at the lower level A and a minimum or zero differential with the liquid level at the upper or reference level B.

For the convenience of the cooks, when applied to a sulphite digester, the instrument is preferably calibrated to read in inches of liquor level below the reference level B, i. e. inches from the top of the digester, so the instrument is set up to read zero inches for zero differential and maximum inches for maximum differential.

In the calibration of the instrument to read inches of liquor level below the reference point B, corrections may be made to compensate for the differences between the densities of water and of the liquor in the digester. Also, as the liquor level rises above the point 21 the pressure on the high pressure side of the manometer may be influenced by the hydrostatic pressure of the liquor above point 21 and so an additional correction may be needed to the calibration in this range. This correction may be minimized by providing a condensing chamber 19 of relatively large volume.

As many embodiments may be made of the above invention, and as many changes might be made in the embodiment above described, it is to be understood that all matter hereinbefore set forth or shown in the accompanying drawings is to be interpreted as illustrative only and not in a limiting sense.

I claim:

1. In apparatus for measuring and recording the level of a liquid in a tank containing chemically active liquid and vapors, in combination, a differential pressure measuring and recording instrument of the manometer type having high and low pressure legs, one of the legs having a relatively large cross-sectional area and a float in said leg for operating a recording mechanism, first pipe means connecting the high pressure leg with said tank at a point near the top thereof, second pipe means connecting the other leg to said tank at a second point lower down thereon, said pipe means having a common connection with a water supply, valve means in said pipe means for separately admitting fresh water to said respective pipe means for flushing the same, means in said first pipe means interposed between said tank and said instrument providing a body of liquid automatically maintained at a constant level to provide a standard reference level for said instrument, and means in said second pipe means interposed between said tank and said instrument providing a relatively large body of water as a water seal to forestall migration of the chemically active liquid in said tank through said pipe means to said instrument due to movement of liquid in said pipe means caused by changes in differential pressure.

2. In apparatus for measuring and recording the level of a liquid in a tank containing chemically active liquid by means of a differential pressure measuring and recording instrument having high and low pressure chambers, at least one of which being so constructed that a relatively large volume of liquid may be displaced from said chambers during operation of said instrument, in combination, pipe means for connecting one chamber of said instrument with said tank at a point near the top thereof and connecting the other chamber of said instrument to said tank at a second point lower down thereon, said pipe means having connection with a supply of liquid chemically inactive with respect to the parts of said instrument which are exposed thereto and not disadvantageously affected by association with said chemically active liquid, and valve means in said pipe means for admitting said inactive liquid to said pipe means to flush the same, said pipe means being of such size as to hold a quantity of said inactive liquid sufficient to forestall undesired migration of the chemically active liquid through said chemically inactive liquid to said instrument during the time when said pipe means are not being flushed with said inactive liquid.

3. In apparatus for measuring and recording the level of a liquid in a tank containing chemically active liquid by means of a differential pressure measuring and recording instrument having high and low pressure chambers, at least one of which being so constructed that a relatively large volume of liquid may be displaced from said chambers during operation of said instrument, in combination, pipe means for connecting one chamber of said instrument with said tank at a point near the top thereof and connecting the other chamber of said instrument to said tank at a second point lower down thereon, said pipe means having connection with a supply of liquid chemically inactive with respect to the parts of said instrument which are exposed thereto and not disadvantageously affected by association with said chemically active liquid, valve means in said pipe means for admitting said inactive liquid to said pipe means, and means in said pipe means interposed between said tank and said instrument providing relatively large body of said inactive liquid to forestall undesired migration of the chemically active liquid through said chemically inactive liquid to said instrument.

4. In apparatus for measuring and recording the level of a liquid in a tank containing chemically active liquid, in combination, a differential pressure measuring and recording instrument having high and low pressure chambers, pipe means for connecting one chamber of said instrument with said tank at a point near the top thereof and for connecting the other chamber of said instrument with said tank at a second point lower down thereon, said pipe means having connection with a supply of liquid chemically inactive with respect to the portions of said instrument which are exposed thereto and not disadvantageously affected by association with said chemically active liquid, at least one of said chambers of said instrument being so constructed that a relatively large volume of liquid may move into and out of said chamber during operation of said instrument thus disturbing the liquid in said pipe means and causing migration of the chemically active liquid from the tank toward the instrument, and valve means in said pipe means for admitting said inactive liquid to said pipe means simultaneously to flush the same to forestall said migration of the chemically active liquid to the instrument and to change the differential pressure on said instrument to record the flushing operation.

5. In apparatus for measuring and recording the level of a chemically active liquid in a pulp cooking digester, in combination, a differential pressure measuring and recording instrument of the mercury manometer type having high and low pressure chambers, and a float in one of said chambers for operating a recording mechanism, first pipe means connecting the high pressure chamber with said digester at a point near the top thereof, second pipe means connecting the other chamber to said digester at a second point lower down thereon, said pipe means having a common connection with the water supply, at least one of said chambers of said instrument having a relatively large cross-sectional area whereby a relatively large volume of liquid may move into and out of said chamber during operation of said instrument thus disturbing the water in said pipe means and causing migration of the chemically active liquid from the tank toward the instrument, and valve means in said pipe means for separately admitting fresh water to said respective pipe means simultaneously for flushing the same to forestall said migration and to change the differential pressure on said instrument to record the flushing operation.

MALCOLM B. HALL.